US012791443B2

United States Patent

(12) United States Patent
Naruse et al.

(10) Patent No.: US 12,791,443 B2
(45) Date of Patent: Nov. 10, 2026

(54) TIRE INFORMATION DETECTING DEVICE

(71) Applicants: The Yokohama Rubber Co., LTD., Tokyo (JP); ALPS ALPINE CO., LTD., Tokyo (JP)

(72) Inventors: Masahiro Naruse, Kanagawa (JP); Jun Matsuda, Kanagawa (JP); Heishiro Fudo, Tokyo (JP); Eiji Shinohara, Tokyo (JP); Shinya Ichise, Tokyo (JP); Hiroyuki Tobari, Tokyo (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 617 days.

(21) Appl. No.: 17/995,377

(22) PCT Filed: Mar. 18, 2021

(86) PCT No.: PCT/JP2021/011114
§ 371 (c)(1),
(2) Date: Oct. 3, 2022

(87) PCT Pub. No.: WO2021/205839
PCT Pub. Date: Oct. 14, 2021

(65) Prior Publication Data

US 2023/0160780 A1 May 25, 2023

(30) Foreign Application Priority Data

Apr. 8, 2020 (JP) ................................ 2020-069586

(51) Int. Cl.
*G01M 17/02* (2006.01)
*B60C 23/06* (2006.01)
(Continued)

(52) U.S. Cl.
CPC ........... *G01M 17/02* (2013.01); *B60C 23/061* (2013.01); *B60C 23/064* (2013.01); *G01B 7/16* (2013.01);
(Continued)

(58) Field of Classification Search
CPC .. G01M 17/02; G01M 17/027; G01M 17/025; G01M 17/06; G01M 5/0041;
(Continued)

(56) References Cited

U.S. PATENT DOCUMENTS

| | | | | |
|---|---|---|---|---|
| 7,549,327 B2 * | 6/2009 | Breed | .................. | B60C 23/041 73/146 |
| 2006/0243043 A1 * | 11/2006 | Breed | .................. | B60C 23/041 73/146 |

(Continued)

FOREIGN PATENT DOCUMENTS

| | | | | |
|---|---|---|---|---|
| EP | 2810794 A1 * | 12/2014 | ........... | B60C 11/243 |
| FR | 3020680 A1 * | 11/2015 | ........... | B60C 11/243 |

(Continued)

*Primary Examiner* — Paul D Lee
(74) *Attorney, Agent, or Firm* — Thorpe North & Western

(57) ABSTRACT

Provided is a tire information detecting device configured to detect tire information including at least one of wear of a tire, deformation of the tire, a road surface state, a ground contact state of the tire, presence of failure of the tire, a travel history of the tire, or a load state of the tire includes at least one sensor module disposed on a tire inner surface and a determination unit configured to determine an attachment state of the sensor module based on a measurement value supplied from the sensor module.

20 Claims, 11 Drawing Sheets

(51) Int. Cl.

| | |
|---|---|
| ***G01B 7/16*** | (2006.01) |
| ***G01L 17/00*** | (2006.01) |
| *B60C 11/24* | (2006.01) |
| *B60C 23/04* | (2006.01) |

(52) U.S. Cl.
CPC ............. *G01L 17/00* (2013.01); *B60C 11/243* (2013.01); *B60C 23/0481* (2013.01); *B60C 23/0493* (2013.01)

(58) Field of Classification Search
CPC . B60C 11/243; B60C 11/246; B60C 23/0493; B60C 23/061; B60C 23/064; B60C 23/04; B60C 23/0408; B60C 23/02; B60C 23/0411; B60C 23/0486; B60C 19/00; B60C 2019/004; G01B 7/16; G01B 5/30; G01B 21/32; G01L 17/00; G01L 17/005; G01L 1/22; G01L 1/16; G01L 1/18; G01L 1/14; G01L 19/083; G01L 5/1627
USPC ...... 73/146.2, 146, 146.8, 146.5, 49, 8, 775, 73/768, 779, 767, 727, 753; 152/152.1, 152/151; 702/35, 140, 148, 34, 145, 98, 702/42, 127, 183, 182, 33, 104, 84, 189, 702/75, 66, 67, 70
See application file for complete search history.

(56) References Cited

U.S. PATENT DOCUMENTS

| | | | | |
|---|---|---|---|---|
| 2008/0284575 | A1* | 11/2008 | Breed | H01H 35/146 701/31.4 |
| 2009/0055040 | A1* | 2/2009 | Nagaya | B60T 8/1725 701/31.4 |
| 2018/0060546 | A1* | 3/2018 | Yin | H04W 12/06 |
| 2019/0212360 | A1* | 7/2019 | Masago | B60C 23/0488 |
| 2020/0064967 | A1* | 2/2020 | Shin | G02F 1/13338 |
| 2020/0298635 | A1* | 9/2020 | Suzuki | B60C 19/00 |

FOREIGN PATENT DOCUMENTS

| | | | | | |
|---|---|---|---|---|---|
| FR | 3030374 | A1 | * | 6/2016 | G01M 17/02 |
| JP | 2007-153034 | A | | 6/2007 | |
| JP | 2009-018667 | A | | 1/2009 | |
| JP | 4242200 | B2 | * | 3/2009 | B60C 19/00 |
| JP | 2012516258 | A | * | 7/2012 | B60C 11/24 |
| JP | 2017043343 | A | * | 3/2017 | B60C 23/0493 |
| JP | 2018004416 | A | * | 1/2018 | B60C 23/0488 |
| JP | 2018-039377 | A | | 3/2018 | |
| JP | 2018-065494 | A | | 4/2018 | |
| WO | WO-2018003734 | A1 | * | 1/2018 | G01P 21/00 |
| WO | 2020/022158 | A1 | | 1/2020 | |

* cited by examiner

TIRE INFORMATION DETECTING DEVICE

TECHNICAL FIELD

The present technology relates to a tire information detecting device, and particularly relates to a tire information detecting device capable of determining an attachment state of a sensor module based on a measurement value supplied from the sensor module installed in a pneumatic tire and accurately detecting tire information.

BACKGROUND ART

Tire information (a state of wear of a tread portion) of a pneumatic tire has been evaluated based on a measurement value of an acceleration measured by, for example, an acceleration sensor installed in the tire (see, for example, Japan Unexamined Patent Publication No. 2009-018667 A). When the sensor is installed in the tire in this manner, it is necessary to check whether the sensor is attached to the correct position relative to the tire and is functioning normally. However, the attachment state of the sensor has not been determined based on the measurement value measured by the sensor.

SUMMARY

The present technology provides a tire information detecting device capable of determining an attachment state of a sensor module based on a measurement value supplied from the sensor module installed in a pneumatic tire and accurately detecting tire information.

The tire information detecting device according to an embodiment of the present technology configured to detect tire information including at least one of wear of a tire, deformation of the tire, a road surface state, a ground contact state of the tire, presence of failure of the tire, a travel history of the tire, or a load state of the tire includes at least one sensor module disposed on a tire inner surface and a determination unit configured to determine an attachment state of the sensor module based on a measurement value supplied from the sensor module.

An embodiment of the present technology provides at least one sensor module disposed on a tire inner surface; and a determination unit that determines an attachment state of the sensor module based on a measurement value supplied from the sensor module, allowing the attachment state of the sensor module to be determined by using the measurement value supplied from the sensor module and also detecting the tire information in a state where the sensor module is functioning normally.

Preferably, the tire information detecting device according to an embodiment the present technology includes an element that is mounted on the sensor module and configured to generate a voltage based on deformation of a tread portion during tire rotation, a voltage detection unit configured to detect the voltage generated by the element, a storage area configured to store waveform data of the voltage detected by the voltage detection unit over time, and a calculation unit configured to calculate, from the waveform data stored in the storage area, a symmetry of the waveform data that is an index value of the attachment state of the sensor module, and the determination unit determines the attachment state of the sensor module based on the symmetry of the waveform data calculated by the calculation unit. The voltage generated by the element based on the deformation of the tread portion during tire rotation has less noise, can be measured and analyzed, and is suitably an effective index for determining the attachment state of the sensor module.

Preferably, the calculation unit extracts a waveform including a first peak point and a second peak point respectively formed on one side and the other side from a baseline of the waveform data and calculates a line segment SO and a line segment OF from an intersection O where a line connecting the first peak point and the second peak point intersects the baseline of the waveform data, a starting point S of the waveform, and an end point F of the waveform data, and the determination unit determines that the attachment state of the sensor module is good when a ratio of a short line segment to a long line segment of the line segment SO and the line segment OF ranges from 0.4 to 1.0. This can increase the accuracy of determining the attachment state of the sensor module.

Preferably, the calculation unit extracts a waveform including a first peak point and a second peak point respectively formed on one side and the other side from a baseline of the waveform data and calculates an absolute difference $|P1-B|$ between a value P1 of the first peak point and a value B of the baseline of the waveform data and an absolute difference $|B-P2|$ between the value B of the baseline of the waveform data and a value P2 of the second peak point, and the determination unit determines that the attachment state of the sensor module is good when a ratio $|P1-B|/|B-P2|$ of the absolute difference $|P1-B|$ to the absolute difference $|B-P2|$ ranges from 0.2 to 5.0. This can increase the accuracy of determining the attachment state of the sensor module.

Preferably, the calculation unit extracts a waveform including a first peak point and a second peak point respectively formed on one side and the other side from a baseline of the waveform data and calculates an intersection O where a line connecting the first peak point and the second peak point intersects the baseline of the waveform data and areas A1 and A2 of the waveform on both sides of a waveform center axis that passes through the intersection O and is orthogonal to the baseline of the waveform data, and the determination unit determines that the attachment state of the sensor module is good when a ratio of a small area to a large area of the area A1 and the area A2 ranges from 0.4 to 1.0. This can increase the accuracy of determining the attachment state of the sensor module.

Preferably, the calculation unit calculates an index value of voltage change from the waveform data stored in the storage area, and the determination unit determines a progress of wear of the tread portion by comparing the index value of the voltage change calculated by the calculation unit with reference information. This can determine the attachment state of the sensor module and accurately detect the progress of wear of the tread portion.

Preferably, a speed detection unit configured to detect vehicle speed or tire rotation speed is further included, the storage area stores the waveform data of the voltage detected by the voltage detection unit over time together with the vehicle speed or the tire rotation speed detected by the speed detection unit, the calculation unit calculates an index value of voltage change from waveform data in a predetermined speed range stored in the storage area, and the determination unit determines a progress of wear of the tread portion by comparing the index value of the voltage change calculated by the calculation unit with reference information corresponding to the predetermined speed range. This can determine the attachment state of the sensor module and accurately detect the progress of wear of the tread portion.

The calculation unit preferably calculates, as an index value of voltage change, a peak amplitude value between a maximum value P1 and a minimum value P2 in waveform data. This can improve the accuracy of determining the progress of wear of the tread portion.

Preferably, a speed detection unit configured to detect vehicle speed or tire rotation speed is further included, the storage area stores the waveform data of the voltage detected by the voltage detection unit over time together with the vehicle speed or the tire rotation speed detected by the speed detection unit, the calculation unit calculates frequency of exceedance of a predetermined threshold value from the waveform data in a predetermined speed range and a predetermined time period stored in the storage area, and the determination unit determines the progress of wear of the tread portion based on the frequency of exceedance of the predetermined threshold value calculated by the calculation unit. This can accurately detect the progress of wear of the tread portion.

Preferably, an air pressure detection unit configured to detect air pressure inside a tire is further included, and the calculation unit corrects waveform data or the predetermined threshold value based on the air pressure detected by the air pressure detection unit. Accordingly, the accuracy of determining the progress of wear of the tread portion can be improved.

The determination unit preferably performs at least two determination operations, and conclusively determines the progress of wear of the tread portion based on the results of these determination operations. Accordingly, the occurrence of an unexpected error in conclusive determination results can be reduced, and the accuracy of determining the progress of wear of the tread portion can be improved.

Preferably, the sensor module includes at least the element and the voltage detection unit and is fixed to the tire inner surface via a container into which the sensor module is inserted.

Preferably, the container is bonded to the tire inner surface via an adhesive layer, and as roughness of the tire inner surface, an arithmetic mean height Sa ranges from 0.3 μm to 15.0 μm, and a maximum height Sz ranges from 2.5 μm to 60.0 μm. Accordingly, an adhesion area of the tire inner surface and the adhesive layer can be increased, and the adhesiveness between the tire inner surface and the container can be effectively improved. The roughness of the tire inner surface is measured in accordance with ISO25178. The arithmetic mean height Sa is an average of absolute values of differences from heights of points to an average surface of surfaces, and the maximum height Sz is a distance from the highest point to the lowest point among the surfaces in a height direction.

A width Lc1 of an opening portion of the container and an inner width Lc2 of a bottom surface of the container preferably satisfy a relationship $Lc1<Lc2$. Accordingly, since the width Lc1 of the opening portion is relatively small, it is possible to prevent the sensor module housed in the container from falling off, and it is possible to provide both workability for inserting the sensor module and a holding property of the container in a compatible manner.

The width Lc1 of the opening portion of the container and a maximum width Lsm of the sensor module preferably satisfy a relationship $0.10 \le Lc1/Lsm \le 0.95$. By appropriately setting a ratio of the width Lc1 of the opening portion to the maximum width Lsm of the sensor module, it is possible to effectively prevent the sensor module from falling off, and it is possible to improve the workability for inserting the sensor module and the holding property of the container.

The width Lc1 of the opening portion of the container, the inner width Lc2 of the bottom surface of the container, a width Ls1 of an upper surface of the sensor module, and a width Ls2 of a lower surface of the sensor module preferably satisfy a relationship $Lc1<Ls1 \le Ls2 \le Lc2$. Appropriately setting the widths of the container and the sensor module can effectively prevent the sensor module from falling off.

An average thickness of the container preferably ranges from 0.5 mm to 5.0 mm. Accordingly, it is possible to improve the workability for inserting the sensor module, the holding property of the container, and the breaking resistance of the container in a well-balanced manner.

A ratio of a height Hc of the container with the sensor module inserted to a height Hs of the sensor module preferably ranges from 0.5 to 1.5. This can effectively prevent the sensor module from falling off.

An elongation at break EB of rubber constituting the container preferably ranges from 50% to 900%, and a modulus at 300% elongation of the rubber constituting the container preferably ranges from 2 MPa to 15 MPa. Accordingly, it is possible to improve the workability for inserting the sensor module, the holding property of the container, and the breaking resistance of the container in a well-balanced manner. The elongation at break and the modulus at 300% elongation of the rubber constituting the container are measured in accordance with JIS (Japanese Industrial Standard)-K6251.

The container is preferably disposed on an inner side of a ground contact edge in a tire width direction. Accordingly, the sensor module inserted into the container can accurately acquire the tire information.

The element is preferably a piezoelectric element. A piezoelectric element has a structure to generate voltage based on the deformation of the tread portion during tire rotation. This structure is less likely to be affected by noise than an acceleration sensor or the like, and enables an accurate detection.

In an embodiment of the present technology, "ground contact edge" refers to an end portion in the tire axial direction of a tire mounted on a regular rim and inflated to a regular internal pressure and placed vertically on a flat surface with a regular load applied to the tire. "Regular rim" refers to a rim defined by a standard for each tire according to a system of standards that includes standards with which tires comply and is "standard rim" defined by Japan Automobile Tyre Manufacturers Association (JATMA), "Design Rim" defined by The Tire and Rim Association, Inc. (TRA), or "Measuring Rim" defined by European Tire and Rim Technical Organization (ETRTO), for example. In a system of standards including standards with which tires comply, "regular internal pressure" refers to air pressure defined by each of the standards for each tire and is "maximum air pressure" defined by JATMA, a maximum value described in the table "TIRE LOAD LIMITS AT VARIOUS COLD INFLATION PRESSURES" defined by TRA, or "INFLATION PRESSURE" defined by ETRTO. However, "regular internal pressure" is 250 kPa in a case where a tire is a tire for a passenger vehicle. "Regular load" is a load defined by a standard for each tire according to a system of standards that includes standards with which tires comply and is a "maximum load capacity" defined by JATMA, a maximum value described in the table "TIRE LOAD LIMITS AT VARIOUS COLD INFLATION PRESSURES" defined by TRA, or "LOAD CAPACITY" defined by ETRTO. However, "regular load" is a load corresponding to 80% of the load described above in a case where a tire is a tire for a passenger vehicle.

DETAILED DESCRIPTION

Figure 1:
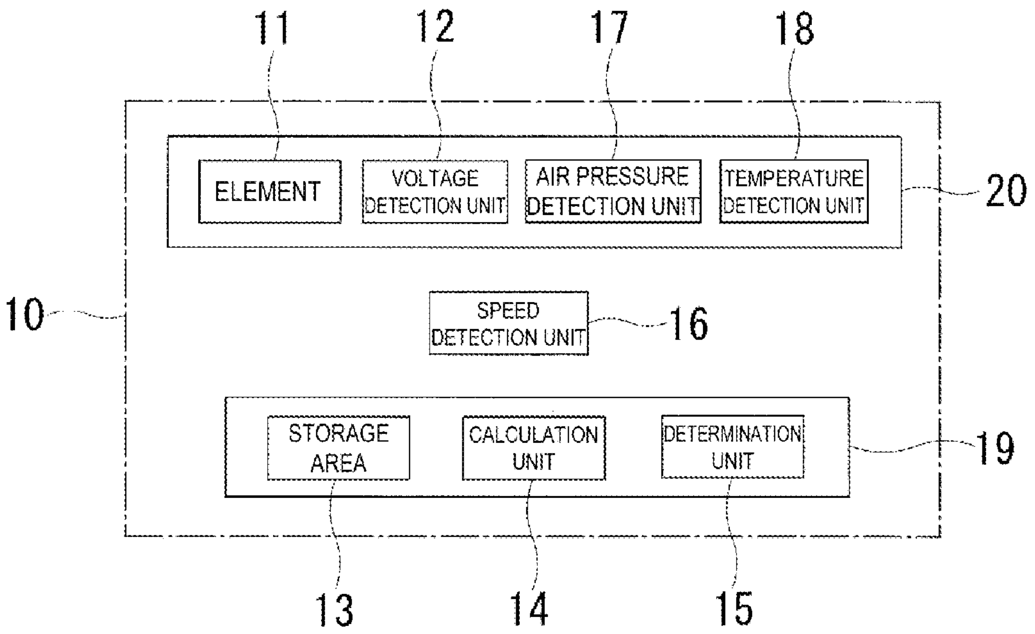
FIG. 1 is an explanatory diagram illustrating an example of a tire information detecting device according to an embodiment of the present technology.

A configuration according to an embodiment of the present technology will be described in detail below with reference to the accompanying drawings. FIG. 1 illustrates a tire information detecting device according to an embodiment of the present technology.

Figure 9:
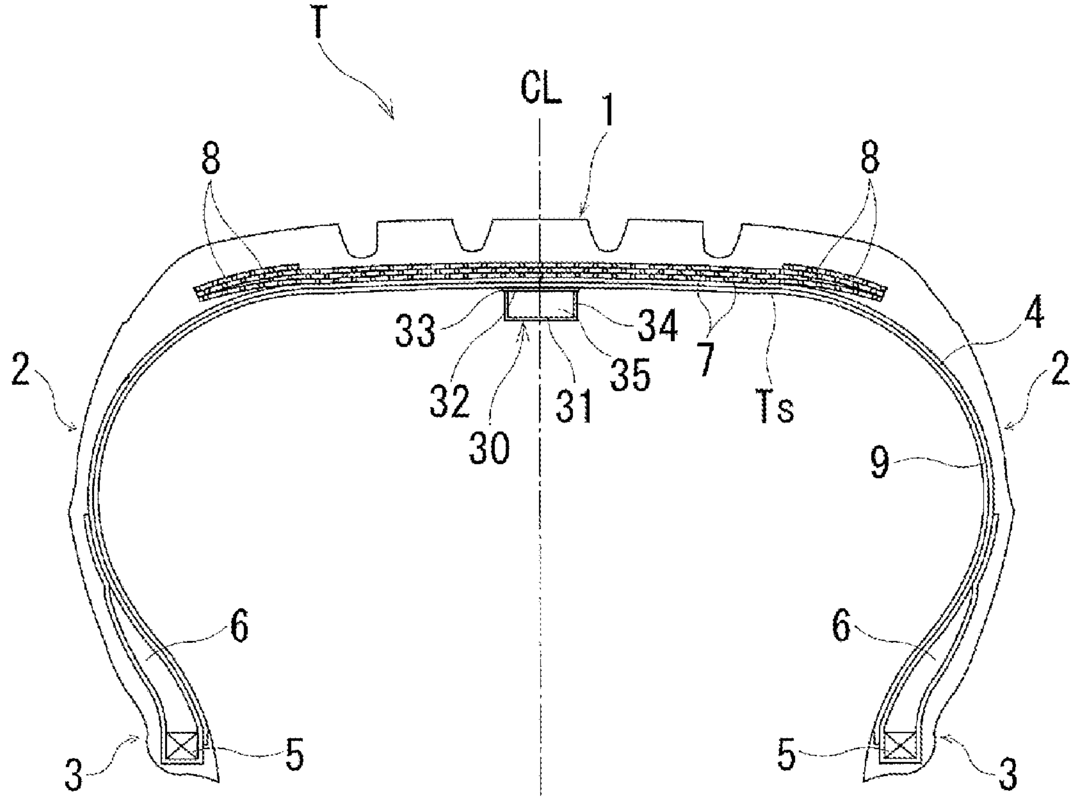
FIG. 9 is a meridian cross-sectional view illustrating a pneumatic tire for which a wear condition is determined by a tire information detecting device according to an embodiment of the present technology.

The tire information detecting device 10 determines whether the attachment state of the sensor module 20 is good on the basis of the measurement value supplied from the sensor module 20 when detecting the tire information of the tire T (for example, see FIG. 9). Furthermore, the tire information detecting device 10 detects the tire information of the tire T on the basis of the measurement value supplied from the sensor module 20.

The tire information is a group including wear of a tire, deformation of the tire, a road surface state, a ground contact state of the tire, presence of failure of the tire, a travel history of the tire, and a load state of the tire. At least one of this group can be selected and utilized as tire information. The tire information is not limited to the above-described group and may be added as appropriate. Hereinafter, the tire information detecting device 10 for detecting the wear of the tire T (progress of wear of the tread portion 1) as the tire information will be described.

As illustrated in FIG. 1, the tire information detecting device 10 includes an element 11 mounted on the sensor module 20 to generate a voltage based on deformation of the tread portion 1 during tire rotation, a voltage detection unit 12 configured to detect the voltage generated by the element 11, a storage area 13 configured to store waveform data of the voltage detected by the voltage detection unit 12 over time, a calculation unit 14 configured to calculate, from the waveform data stored in the storage area 13, a symmetry of the waveform data that is an index value of the attachment state of the sensor module 20, and a determination unit 15 configured to determine the attachment state of the sensor module 20 based on the symmetry of the waveform data calculated by the calculation unit 14.

The tire information detecting device 10 may include a speed detection unit 16 configured to detect vehicle speed or tire rotation speed, an air pressure detection unit 17 configured to detect air pressure inside a tire, or a temperature detection unit 18 configured to detect temperature inside the tire, in addition to the voltage detection unit 12. Further, devices such as an input device, an output device, and a display may be appropriately added to the tire information detecting device 10.

In the tire information detecting device 10, the storage area 13, the calculation unit 14, and the determination unit 15 function as a data processing device 19. The data processing device 19 processes data input from a detection unit represented by the voltage detection unit 12. Data input to the data processing device 19 may be performed either by wire or by wireless.

The sensor module 20 includes at least the element 11 and the voltage detection unit 12 for acquiring tire information. The sensor module 20 can be mounted with sensors so as to include the air pressure detection unit 17 and the temperature detection unit 18, as appropriate, together with the element 11 and the voltage detection unit 12.

The element 11 is a component of the voltage detection unit 12 and is included in the voltage detection unit 12. The element 11 is not limited and only needs to generate voltage in proportion to the amount of deformation (deformation energy) of the tread portion 1 during tire rotation. As such an element 11, for example, a piezoelectric element can be used. The piezoelectric element is disposed so as to be directly or indirectly in contact with a tire inner surface and is configured to be capable of detecting deformation of the tread portion 1. The element being indirectly in contact with the tire inner surface means that deformation of the tread portion 1 can be sensed even when another member intervenes between the element and the tire inner surface, such as in the case where the element is in contact with the tire inner surface via a housing of the sensor module 20 or where the element is covered with a protective layer made of rubber or the like and is in contact with the tire inner surface via the protective layer. The piezoelectric element has a structure to generate voltage based on deformation of the tread portion 1 during tire rotation as described above, and thus is less likely to be affected by noise and enables an accurate detection.

The voltage detection unit 12 is a voltage sensor configured to detect potential difference in the element 11 that is electrically charged. The voltage detection unit 12 includes the element 11 that generates voltage based on deformation of the tread portion 1 during tire rotation, and thus is different from a strain sensor that detects strain. The speed detection unit 16 may detect measurement data (vehicle speed) by a speed meter on a vehicle side or may detect a tire rotation speed by using a sensor capable of detecting the tire rotation speed. Further, a pressure sensor may be used as the air pressure detection unit 17, and a temperature sensor may be used as the temperature detection unit 18.

Figure 2:
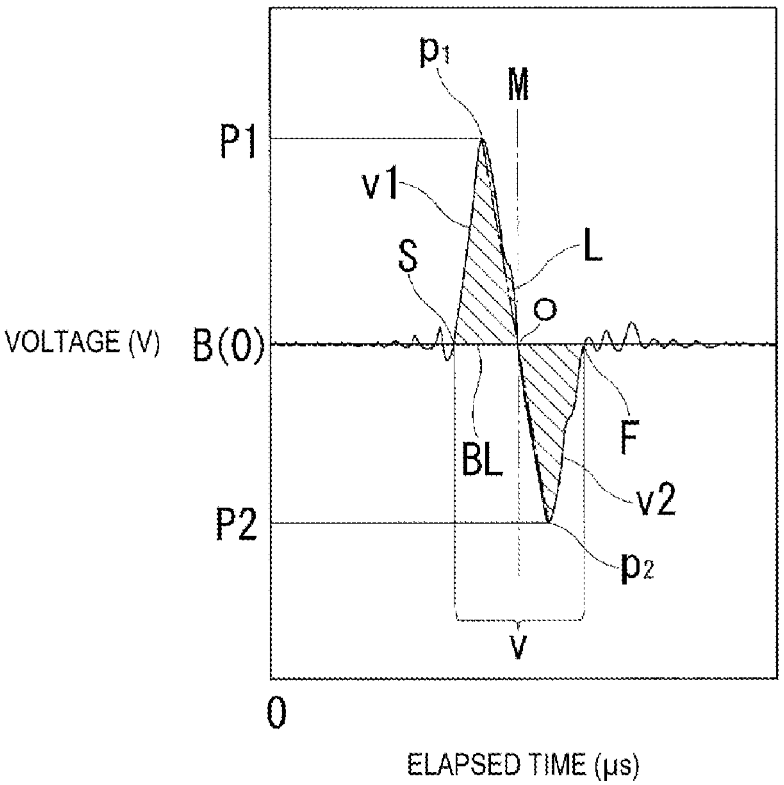
FIG. 2 is a graph showing an example of waveform data stored in a storage area of a tire information detecting device according to an embodiment of the present technology.
Figure 3:
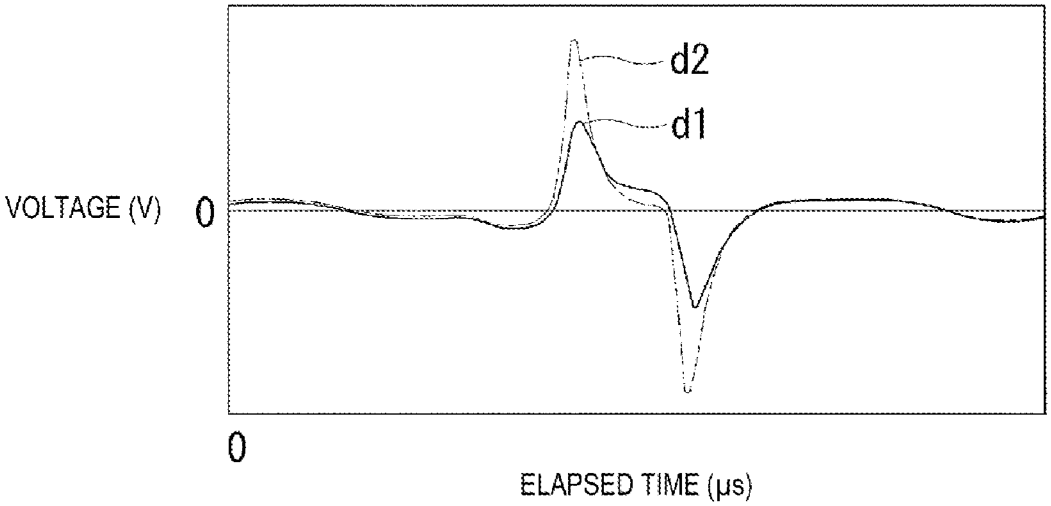
FIG. 3 is a graph showing another example of waveform data stored in a storage area of a tire information detecting device according to an embodiment of the present technology.

The storage area 13 stores the waveform data of the voltage detected by the voltage detection unit 12 overtime. Here, the storage area 13 can be composed of an external storage device such as a hard disk or an internal storage device such as a RAM (Random Access Memory), or a combination thereof. FIG. 2 illustrates waveform data stored in the storage area 13. In FIG. 2, the vertical axis represents voltage (V), the horizontal axis represents elapsed time (μs), and waveform data corresponding to one rotation of the tire T is illustrated. During one rotation of the tire T, the waveform (voltage) reaches a peak (a maximum value or a minimum value) when a point on the circumference of the tire T comes to a ground contact leading edge and to a ground contact trailing edge. FIG. 3 illustrates another example of the waveform data stored in the storage area 13. In FIG. 3, waveform data d1 is data of when the tire T is in new condition, and waveform data d2 is data of when the wear of the tread portion 1 of the tire T has progressed (late stage of wear). That is, as the wear of the tread portion 1 of the tire T progresses, the peak values of the voltage at the positions of the ground contact leading edge and the ground contact trailing edge tend to increase. Note that the waveform data illustrated in FIGS. 2 and 3 is a typical example and is not limited thereto.

In addition, in a case where the tire information detecting device 10 includes the speed detection unit 16, the storage area 13 stores the waveform data of the voltage detected by the voltage detection unit 12 together with the vehicle speed or the tire rotation speed detected by the speed detection unit 16. That is, the vehicle speed or the tire rotation speed and the waveform data of the voltage are linked to each other and integrally stored in the storage area 13. Further, in a case where the tire information detecting device 10 includes the air pressure detection unit 17 and the temperature detection unit 18, the storage area 13 stores the waveform data of the voltage detected by the voltage detection unit 12 together with the air pressure and the temperature respectively detected by the air pressure detection unit 17 and the temperature detection unit 18. That is, the air pressure and the temperature and the waveform data of the voltage are linked to each other and integrally stored in the storage area 13.

When detecting the attachment state of the sensor module 20, the calculation unit 14 calculates, from the waveform data stored in the storage area 13, the symmetry of the waveform data that is the index value of the attachment state of the sensor module 20. At that time, the calculation unit 14 reads out the waveform data stored in the storage area 13 and executes calculation, and stores the calculated index value of the attachment state of the sensor module 20 in the storage area 13. Additionally, the calculation unit 14 can perform calculation based on the waveform data for a plurality of rotations of the tire T, and the waveform data of five rotations or more is preferable in order to prevent erroneous determination.

Specifically, when calculating the symmetry of the waveform data, the calculation unit 14 extracts, from the waveform data stored in the storage area 13, a waveform v including a first peak point $p_1$ (the maximum value in FIG. 2) and a second peak point $p_2$ (the minimum value in FIG. 2) respectively formed on one side and the other side from a baseline BL of the waveform data and performs a calculation processing of any one of from (a) to (c) below. The baseline BL is a reference line of a numerical value in the waveform data and does not necessarily indicate zero as a numerical value (the value B of the baseline BL is a voltage 0 [V] in FIG. 2). The baseline BL may also use an approximation line obtained by removing high frequency noise and gradual displacement tendency (trend) by moving average processing. Note that the symmetry of the waveform data means that the waveform v1 and the waveform v2 have a point-symmetric relationship to each other with respect to the intersection O and have a line-symmetric relationship with respect to the waveform central axis M but does not necessarily have a perfect symmetry.

(a) In the extracted waveform v, the calculation unit 14 calculates a line segment SO and a line segment OF from an intersection O where a line L connecting the first peak point $p_1$ and the second peak point $p_2$ intersects the baseline BL, a starting point S of the waveform v, and an end point F of the waveform v. The calculation unit 14 calculates a ratio of a short line segment to a long line segment of the line segment SO and the line segment OF.

(b) In the extracted waveform v, the calculation unit 14 calculates an absolute difference $|P1-B|$ between a value P1 of the first peak point $p_1$ and a value B of the baseline BL of the waveform data and an absolute difference $|B-P2|$ between the value B of the baseline BL of the waveform data and a value P2 of the second peak point $p_2$. The calculation unit 14 calculates the ratio $|P1-B|/|B-P2|$ of the absolute difference $|P1-B|$ to the absolute difference $|B-P2|$.

(c) In the extracted waveform v, the calculation unit 14 calculates an intersection O where a line L connecting the first peak point $p_1$ and the second peak point $p_2$ intersects the baseline BL and an area A1 of the waveform v1 and an area A2 of the waveform v2 (areas of shaded portions in FIG. 2) respectively on one side and the other side from a waveform center axis M that passes through the intersection O and is orthogonal to the baseline BL. The calculation unit 14 calculates the ratio of a small area to a large area of the area A1 and the area A2.

When detecting the wear of the tire T, the calculation unit 14 calculates an index value of voltage change from the waveform data stored in the storage area 13. At that time, the calculation unit 14 can store the calculated index value in the storage area 13 and can read out the stored index value and perform calculation. Here, as an index value of voltage change, a peak amplitude value between the maximum value and the minimum value in the waveform data or an area of the waveform data can be used. In addition, the calculation unit 14 can also read out two index values of voltage changes from the storage area 13 and calculate a change rate of one index value of the voltage change with respect to the other index value of the voltage change. The calculation unit 14 can be composed of, for example, a memory or a CPU (Central Processing Unit).

Further, in a case where the tire information detecting device 10 includes the speed detection unit 16, when detecting the wear of the tire T, the calculation unit 14 calculates an index value of voltage change from waveform data in a predetermined speed range stored in the storage area 13. Here, the predetermined speed range is a speed range in which a lower limit is −5 km/h with respect to an arbitrary speed [km/h] and an upper limit is +5 km/h with respect to the arbitrary speed. The arbitrary speed can be set, for example, within a range of 30 km/h to 60 km/h.

Furthermore, in a case where the tire information detecting device 10 includes the air pressure detection unit 17 and the temperature detection unit 18, in detecting the wear of the tire T, the calculation unit 14 can correct waveform data or an index value of the voltage change obtained from the waveform data on the basis of the air pressure detected by the air pressure detection unit 17 and the temperature detected by the temperature detection unit 18. At that time, the calculation unit 14 reads out the waveform data or the index value of the voltage change stored in the storage area 13 and performs correction, and stores the corrected waveform data or the corrected index value of the voltage change in the storage area 13.

When detecting the attachment state of the sensor module 20, the determination unit 15 determines the attachment state of the sensor module 20 based on the symmetry of the waveform data calculated by the calculation unit 14. Specifically, the determination unit 15 performs a determination process of any one of (a) to (c) below. At that time, the determination unit 15 reads out the index value of the symmetry of the waveform data from the storage area 13 and performs determination. Note that the determination unit 15 may be configured to calculate the ratio of the short line segment to the long line segment of the line segment SO and the line segment OF based on the line segment SO and the line segment OF calculated by the calculation unit 14.

(a) In a case where the calculation unit 14 calculates the line segment SO and the line segment OF of the waveform v, the determination unit 15 determines that the attachment state of the sensor module 20 is good when the ratio of the short line segment to the long line segment of the line segment SO and the line segment OF ranges from 0.4 to 1.0.

(b) In a case where the calculation unit 14 calculates the absolute difference $|P1-B|$ and the absolute difference $|B-P2|$ of the waveform v, the determination unit 15 determines that the attachment state of the sensor module 20 is good when the ratio $|P1-B|/|B-P2|$ of the absolute difference $|P1-B|$ to the absolute difference $|B-P2|$ ranges from 0.2 to 5.0.

(c) In a case where the calculation unit 14 calculates the area A1 and the area A2 of the waveform v, the determination unit 15 determines that the attachment state of the sensor module 20 is good when the ratio of the small area to the large area of the area A1 and the area A2 ranges from 0.4 to 1.0.

When detection the wear of the tire T, the determination unit 15 determines the progress of wear of the tread portion 1 by comparing the index value of the voltage change calculated by the calculation unit 14 with reference information. At that time, the determination unit 15 reads out the index value of the voltage change from the storage area 13 and performs determination. The reference information compared with the index value of the voltage change is a criterion for determining that the tread portion 1 is worn. As the reference information, a ratio with respect to an index value of voltage change of when in new condition or a predetermined threshold value may be used. As a specific example, it is possible to set an arbitrary change rate (%) with respect to an index value of voltage change of when in new condition, or set a threshold value that has been examined in advance for a specific index value of voltage change. Note that determination results by the determination unit 15 can be indicated on a display provided on a vehicle, for example.

In a case where the tire information detecting device 10 includes the speed detection unit 16, when detecting the wear of the tire T, the determination unit 15 determines the progress of wear of the tread portion 1 by comparing the index value of the voltage change calculated by the calculation unit 14 with reference information corresponding to the predetermined speed range.

Figure 4:
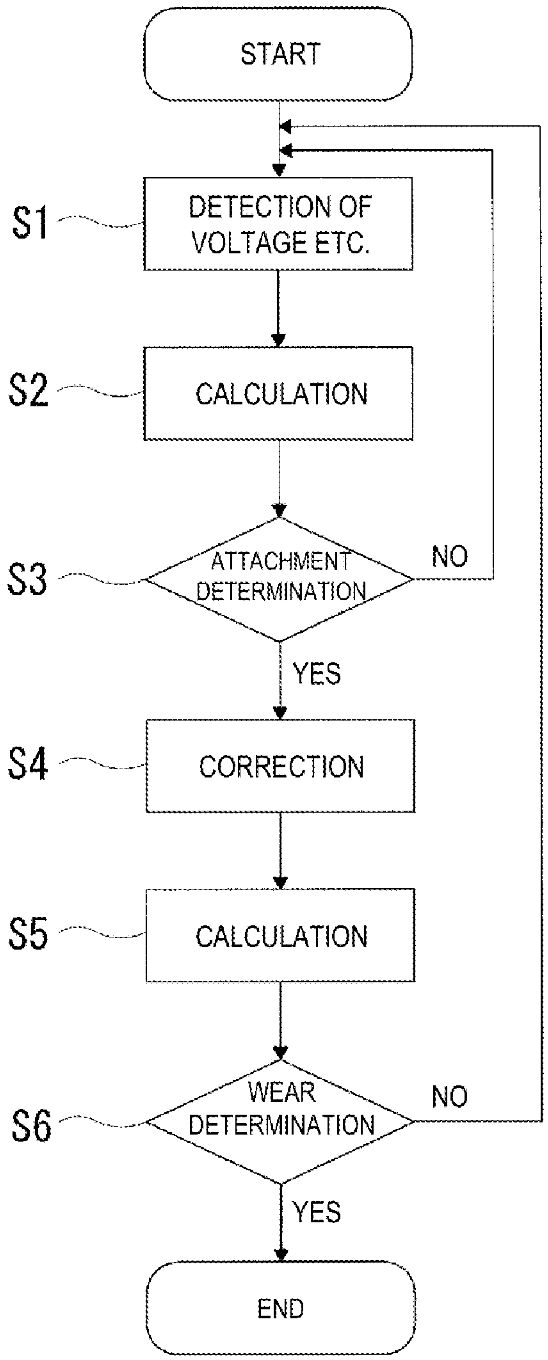
FIG. 4 is a flowchart illustrating an example of a procedure of a detection method using a tire information detecting device according to an embodiment of the present technology.

FIG. 4 illustrates a procedure of a detection method using a tire information detecting device according to an embodiment of the present technology. In detecting the attachment state of the sensor module 20 attached to the tire T and the progress of wear of the tread portion 1 of the tire T, in step S1, the voltage detection unit 12 of the tire information detecting device 10 detects voltage generated based on deformation of the tread portion 1 during the rotation of the tire T. At that time, the storage area 13 stores the waveform data of the voltage detected by the voltage detection unit 12 over time.

Further, in step S1, the speed detection unit 16 detects vehicle speed or tire rotation speed, and the storage area 13 stores the waveform data of the voltage detected by the voltage detection unit 12 together with the vehicle speed or the tire rotation speed detected by the speed detection unit 16. In addition, the air pressure detection unit 17 and the temperature detection unit 18 detect air pressure and temperature, respectively, and the storage area 13 stores the waveform data of the voltage detected by the voltage detection unit 12 together with the air pressure and the temperature respectively detected by the air pressure detection unit 17 and the temperature detection unit 18.

Next, the process proceeds to step S2, and the calculation unit 14 of the tire information detecting device 10 calculates, from the waveform data stored in the storage area 13, the symmetry of the waveform data that is an index value of the attachment state of the sensor module 20. For example, in the extracted waveform v, the calculation unit 14 calculates the line segment SO and the line segment OF from the intersection O, the starting point S of the waveform v, and the end point F of the waveform v and calculates the ratio of the short line segment to the long line segment of the line segment SO and the line segment OF. Then, the calculation unit 14 stores the calculated ratio of the short line segment to the long line segment in the storage area 13.

Next, the process proceeds to step S3, and the determination unit 15 of the tire information detecting device 10 determines the attachment state of the sensor module 20 based on the symmetry of the waveform data calculated by the calculation unit 14. For example, in a case where the calculation unit 14 calculates the line segment SO and the line segment OF with respect to the waveform v, the determination unit 15 determines that the attachment state of the sensor module 20 is good when the ratio of the short line segment to the long line segment of the line segment SO and the line segment OF is in a range of 0.4 to 1.0. The process proceeds to step S4 when the attached state is good, and then returns to step S1 when the attachment state is not good.

Next, the process proceeds to step S4, and the calculation unit 14 of the tire information detecting device 10 corrects the waveform data of the voltage based on the air pressure and the temperature detected by the air pressure detection unit 17 and the temperature detection unit 18. At that time, as a correction operation by the calculation unit 14, for example, when the air pressure detected by the air pressure detection unit 17 is relatively low, the amount of change in the entire tire tends to increase, and consequently the waveform data also tends to increase as a whole. Thus, the calculation unit 14 performs correction such that the waveform data of the voltage is reduced in a predetermined ratio. The correction performed by the calculation unit 14 in this manner can improve the accuracy of determining the progress of wear of the tread portion 1. Then, the calculation unit 14 stores the corrected waveform data in the storage area 13.

Note that air pressure inside a tire varies depending on temperature inside the tire, and thus the temperature detected by the temperature detection unit 18 is used for correction of the air pressure.

Figure 5A:
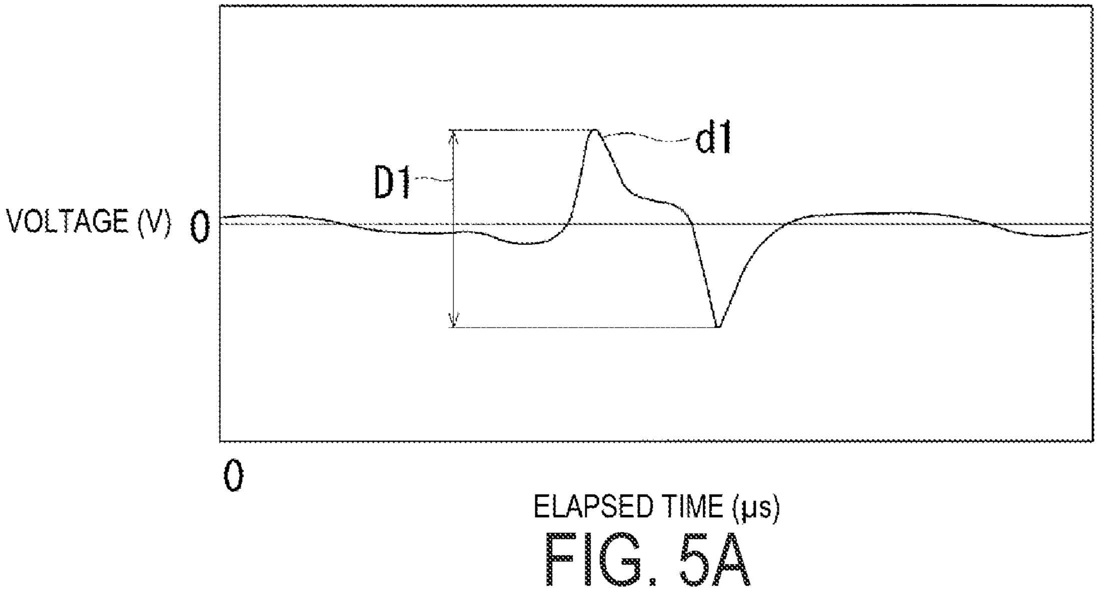
FIGS. 5A and 5B are explanatory diagrams of the waveform data of FIG. 3.
Figure 5B:
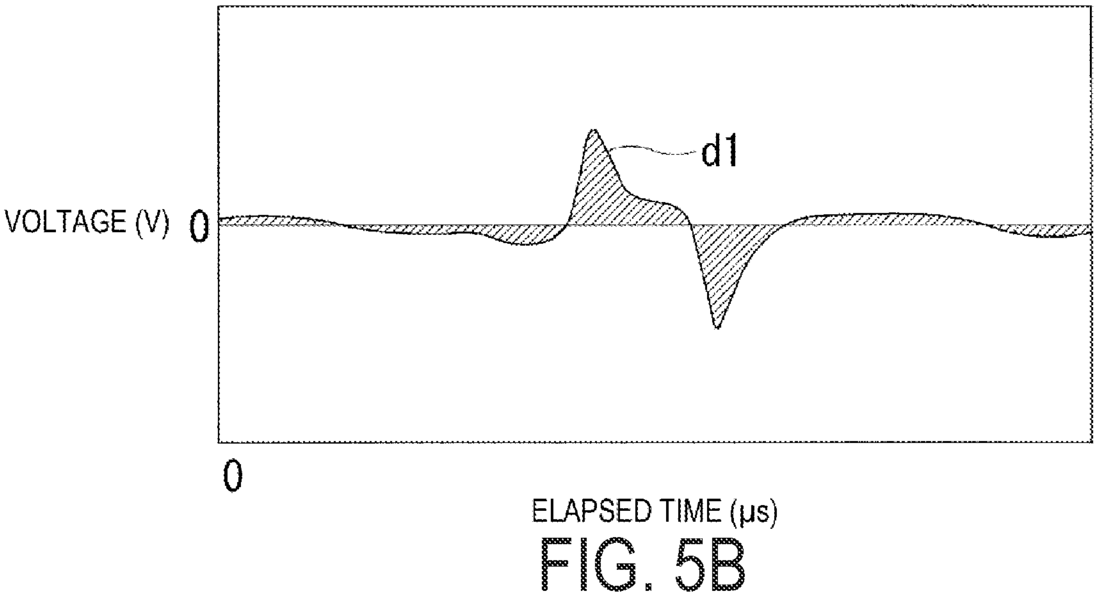

Next, the process proceeds to step S5, and the calculation unit 14 of the tire information detecting device 10 calculates an index value of voltage change from the waveform data in the predetermined speed range stored in the storage area 13. At that time, the calculation unit 14 may calculate a peak amplitude value between the maximum value and the minimum value in the waveform data (see FIG. 5A) or may calculate an area of the waveform data (see FIG. 5B), as the index value of voltage change. More specifically, the calculation unit 14 calculates a peak amplitude value D1 (V) of the waveform data d1 as illustrated in FIG. 5A, or calculates an area of the waveform data d1 (the area of the shaded region indicated) as illustrated in FIG. 5B. Then, the calculation unit 14 stores the calculated index value of the voltage change in the storage area 13. Note that the peak amplitude value D1 calculated by the calculation unit 14 indicates a value of the tire T in new condition.

Next, the process proceeds to step S6, and the determination unit 15 of the tire information detecting device 10 determines the progress of wear of the tread portion 1 by comparing the index value of the voltage change calculated by the calculation unit 14 with reference information. For example, in a case where an index value of voltage change is a peak amplitude value, reference information to be compared is a change rate with respect to the peak amplitude value of when in new condition, and the change rate is set to 150%, the determination unit 15 compares a change rate based on the peak amplitude value calculated by the calculation unit 14 with the predetermined change rate (150%) described above to determine the magnitude relationship between the change rates, and when the predetermined change rate is exceeded, the determination unit 15 concludes that a determination criterion is satisfied. The determination operation terminates when the determination criterion is satisfied as described above. On the other hand, when the determination criterion is not satisfied, the process returns to step S1.

Note that FIG. 4 shows an example in which the progress of wear is determined after the attachment state of the sensor module 20 is determined, but the detection method is not limited to the example. The flow of the determination operation can be changed as appropriate. For example, the determination of the attachment state of the sensor module 20 and the determination of the progress of wear may be performed in parallel. Alternatively, in a case where the attachment state of the sensor module 20 is determined to be normal, the step (S1 to S2) of determining the attachment state of the sensor module 20 in any period may be omitted.

The tire information detecting device 10 described above includes at least one sensor module 20 disposed on the tire inner surface and the determination unit 15 that determines the attachment state of the sensor module 20 on the basis of the measurement value supplied from the sensor module 20. Thus, it is possible to determine the attachment state of the sensor module 20 using the measurement value supplied from the sensor module 20 and also accurately detect the progress of wear of the tread portion 1 while the sensor module 20 is functioning normally. Also, by utilizing the measurement value supplied from the sensor module 20, it is not necessary to add a device dedicated to determining the attachment state of the sensor module 20, and thus an increase in cost can be avoided. Note that the tire information detecting device 10 may additionally be provided with a dedicated device for determining the attachment state of the sensor module 20.

In the tire information detecting device, preferably, when detecting the wear of the tire T, the calculation unit 14 calculates the line segment SO and the line segment OF from the intersection O, the starting point S of the waveform v, and the end point F of the waveform v, and the determination unit 15 determines that the attachment state of the sensor module 20 is good when the ratio of the short line segment to the long line segment of the line segment SO and the line segment OF ranges from 0.4 to 1.0. This can improve the accuracy of determining the attachment state of the sensor module 20. Here, the line segment SO and the line segment OF is not necessarily equivalent, and it is only required that the ratio of the short line segment to the long line segment ranges from 0.4 to 1.0. When the ratio of the short line segment to the long line segment is within the range described above, the sensor module 20 is properly attached in the tire. When the ratio is less than 0.4, the sensor module 20 is not properly attached, and accurate detection is not possible.

In addition, when detecting the wear of the tire T, the calculation unit 14 may calculate an absolute difference |P1−B| between the value P1 of the first peak point $p_1$ and the value B of the baseline BL of the waveform data and an absolute difference |B−P2| between the value B of the baseline BL of the waveform data and the value P2 of the second peak point $p_2$, and the determination unit 15 may determine that the attachment state of the sensor module 20 is good when the ratio |P1−B|/|B−P2| of the absolute difference |P1−B| to the absolute difference |B−P2| ranges from 0.2 to 5.0. In this case, preferably, the calculation unit 14 calculates the ratio described above on the basis of the waveform data of 10 rotations or more of the tire T, and the average value thereof ranges from 0.5 to 2.0. This can improve the accuracy of determining the attachment state of the sensor module 20. Here, when the ratio |P1−B|/|B−P2| is less than 0.2, a detection failure may occur at the ground contact leading edge of the tire. Conversely, when the ratio exceeds 5.0, a detection failure may occur at the ground contact trailing edge of the tire or the absolute difference |P1−B| may be maximized due to damage to the base of the sensor module 20.

Furthermore, when detecting the wear of the tire T, the calculation unit 14 may calculate the intersection O and the areas A1 and A2 of the waveforms v1 and v2 respectively on one side and the other side from the waveform center axis M, and the determination unit 15 may determine that the attachment state of the sensor module 20 is good when the ratio of the small area to the large area of the area A1 and the area A2 ranges from 0.4 to 1.0. This can improve the accuracy of determining the attachment state of the sensor module 20. Here, the area A1 of the waveform v1 and the area A2 of the waveform v2 are not necessarily equivalent, and it is only required that the ratio of the small area to the large area ranges from 0.4 to 1.0. When the ratio of the small area to the large area is within the range described above, the sensor module 20 is properly attached in the tire. When the ratio is less than 0.4, the sensor module 20 is not properly attached, and accurate detection is not possible.

Figure 6:
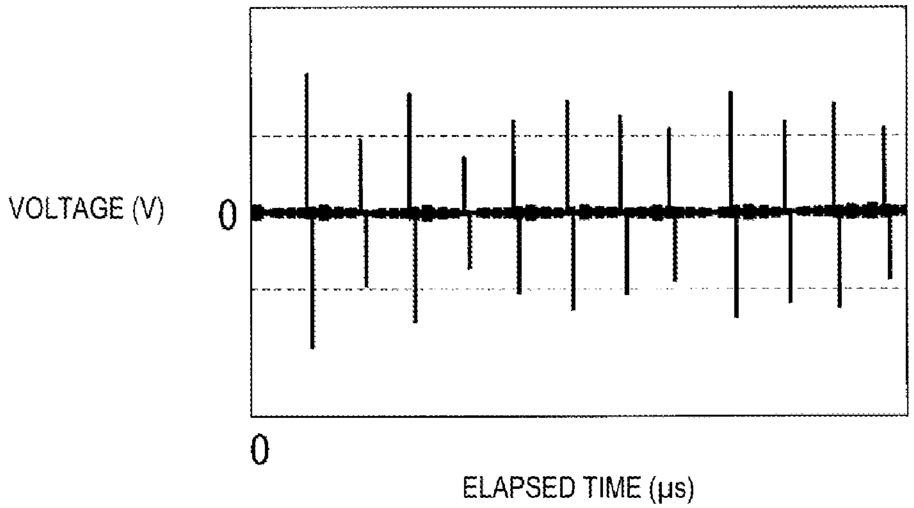
FIG. 6 is a graph showing another example of waveform data stored in a storage area of a tire information detecting device according to an embodiment of the present technology.

In the description described above, in the tire information detecting device 10, the waveform data of one rotation of the tire T is used to calculate the index value of the voltage change, and the calculated index value and reference information are compared to determine wear of the tire T, but the waveform data of a plurality of rotations of the tire T may be used. FIG. 6 illustrates waveform data for a predetermined time period stored in the storage area 13. That is, the waveform data in the predetermined time period includes waveform data for a plurality of rotations of the tire T. The dotted lines in FIG. 6 indicate predetermined threshold values, and, as can be seen, there are a plurality of portions exceeding the predetermined threshold values in the waveform data for the predetermined time period. A case where the waveform data for a plurality of rotations of the tire T is used will be described.

In the tire information detecting device 10, when detecting the wear of the tire T, the calculation unit 14 calculates the frequency of exceedance of the predetermined threshold value from the waveform data in the predetermined speed range and the predetermined time period stored in the storage area 13. Further, the calculation unit 14 can store the calculated waveform data in the storage area 13, and can read out the stored waveform data and perform calculation.

Here, the predetermined speed range is a speed range in which a lower limit is −5 km/h with respect to an optional speed (km/h) and an upper limit is +5 km/h with respect to the optional speed. The optional speed can be set, for example, within a range of from 30 km/h to 60 km/h. The predetermined time period can be set, for example, within a range from 0.1 [sec] to 10.0 [sec]. Further, the predetermined threshold value can be set to a voltage [V] at which it can be determined that the tread portion 1 is worn based on the predetermined speed range and the predetermined time period described above. The predetermined threshold value can be set for both or either of an upper limit range and a lower limit range. Furthermore, for example, the predetermined threshold value can be appropriately defined based on a tire size.

In a case where the tire information detecting device 10 includes the air pressure detection unit 17 and the temperature detection unit 18, when detecting the wear of the tire T, the calculation unit 14 can correct the waveform data or the predetermined threshold value based on the air pressure detected by the air pressure detection unit 17 and the temperature detected by the temperature detection unit 18. At that time, the calculation unit 14 reads out the waveform data in the predetermined speed range and the predetermined time period or the predetermined threshold value stored in the storage area 13 and performs correction, and stores the corrected waveform data or the corrected predetermined threshold value in the storage area 13.

When detecting the wear of the tire T, the determination unit 15 determines the progress of wear of the tread portion 1 based on the frequency of exceedance of the predetermined threshold value calculated by the calculation unit 14. At that time, the determination unit 15 reads out the waveform data in the predetermined speed range and the predetermined time period from the storage area 13 and performs determination.

The tire information detecting device 10 functions in the same manner in steps S1 to S3 of FIG. 4, but in step S4 of FIG. 4, the calculation unit 14 of the tire information detecting device 10 may correct the waveform data of the voltage or the predetermined threshold value based on the air pressure and the temperature detected by the air pressure detection unit 17 and the temperature detection unit 18, respectively. At that time, as a correction operation by the calculation unit 14, for example, when the air pressure detected by the air pressure detection unit 17 is relatively low, the amount of change in the entire tire tends to increase, and consequently the waveform data also tends to increase as a whole. Thus, the calculation unit 14 performs correction such that the waveform data of the voltage is reduced in a predetermined ratio. The correction performed by the calculation unit 14 in this manner can improve the accuracy of determining the progress of wear of the tread portion 1. Then, the calculation unit 14 stores the corrected waveform data or the corrected predetermined threshold value in the storage area 13. Note that air pressure inside a tire varies depending on temperature inside the tire, and thus the temperature detected by the temperature detection unit 18 is used for correction of the air pressure.

Figure 7:
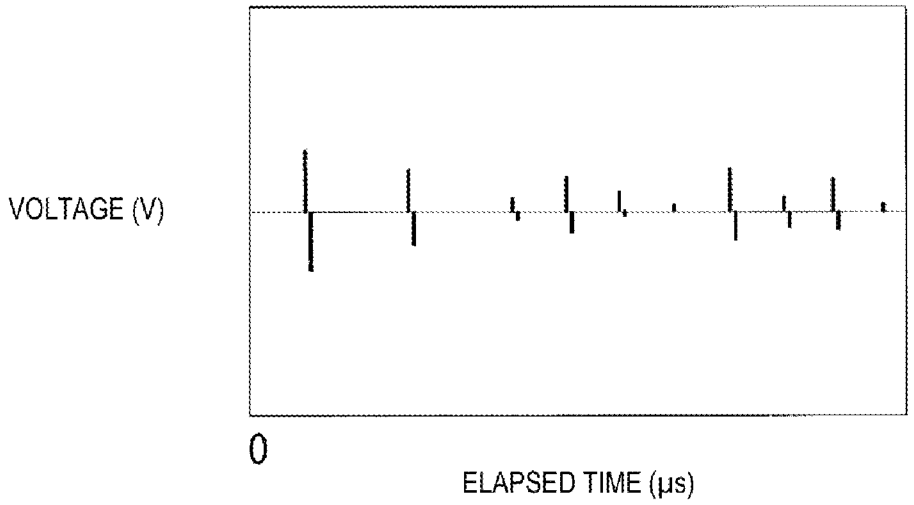
FIG. 7 is a graph of the waveform data of FIG. 6 after masking processing by a calculation unit.

In step S5 of FIG. 4, the calculation unit 14 of the tire information detecting device 10 may calculate the frequency of exceedance of the predetermined threshold value from the waveform data in the predetermined speed range and the predetermined time period stored in the storage area 13. At that time, the calculation unit 14 performs masking of the waveform data based on the predetermined threshold value and calculates the frequency of exceedance. Specifically, the frequency of exceedance can be calculated by performing masking for extracting portions exceeding the predetermined threshold value and by counting the number of the portions exceeding the predetermined threshold value in the waveform data. after the masking (see FIG. 7). Then, the calculation unit 14 stores the calculated waveform data in the storage area 13.

In step S6 of FIG. 4, the determination unit 15 of the tire information detecting device 10 may determine the progress of wear of the tread portion 1 based on the frequency of exceedance of the predetermined threshold value calculated by the calculation unit 14. For example, in a case where a determination criterion for frequency of exceedance is set to 15 times in advance, the determination unit 15 concludes that the determination criterion is not satisfied when the frequency of exceedance ire waveform data at a certain point in time is 10 times, and that the determination criterion is satisfied when the frequency of exceedance in waveform data. at other point in time is 15 times. The determination criterion can be set, for example, as the number of exceedances of the predetermined threshold value, or as a ratio to the number of exceedances in new condition. The determination operation terminates when the determination criterion is satisfied as described above. On the other hand, when the determination criterion is not satisfied, the process returns to step S1. Alternatively, in a case where the attachment state of the sensor module 20 is already determined to be normal, it is possible to omit the step (S1 to S3) of determining the attachment state in any period (for example, it can be set from one minute to one week). As described above, in a case where the waveform data of the plurality of rotations of the tire T is utilized, the tire information detecting device 10 functions differently from when the waveform data of one rotation of the tire T is utilized, but in any case, the progress of wear of the tread portion 1 can be accurately detected.

Figure 8:
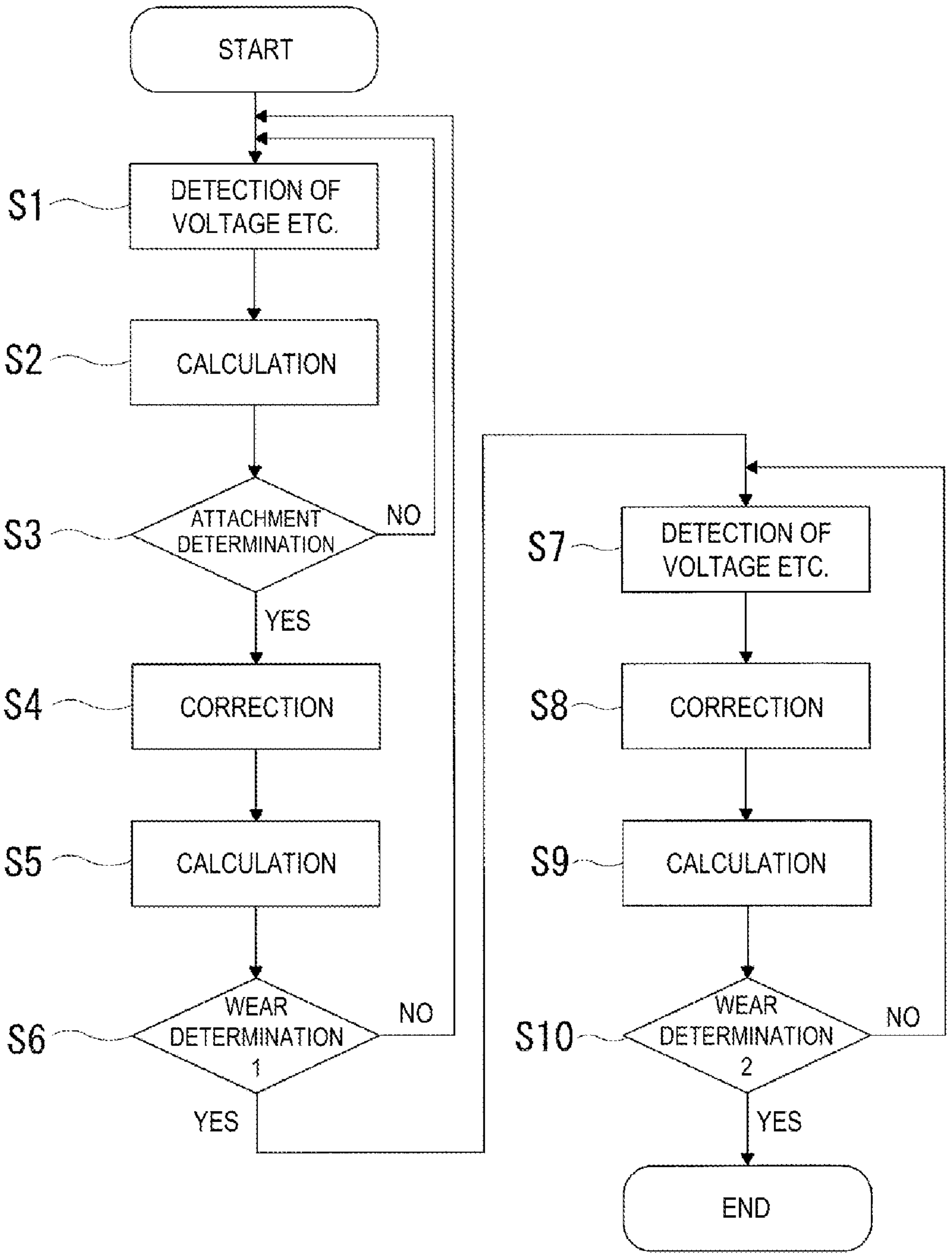
FIG. 8 is a flowchart illustrating a modified example of a procedure of a detection method using a tire information detecting device according to an embodiment of the present technology.

FIG. 8 illustrates a modified example of a procedure of a detection method using a tire information detecting device according to an embodiment of the present technology. In FIG. 8, the determination unit 15 of the tire information detecting device 10 performs at least two determination operations, and conclusively determines the progress of wear of the tread portion 1 based on the results of these determination operations. The procedure illustrated in FIG. 8 is identical to that illustrated in FIG. 4 up to step S6. Next, the process proceeds to step S7 from step S6, and the voltage detection unit 12 detects the voltage generated by the element 11, and the speed detection unit 16 detects vehicle speed or tire rotation speed. Next, the process proceeds to step S8, and the calculation unit 14 corrects the waveform data or the predetermined threshold value based on the air pressure and the temperature detected by the air pressure detection unit 17 and the temperature detection unit 18, respectively. Then, the calculation unit 14 stores the corrected waveform data or the corrected predetermined threshold value in the storage area 13. Next, the process proceeds to step S9, and the calculation unit 14 calculates the index value of the voltage change or the frequency of exceedance of the predetermined threshold value from the waveform data in the predetermined speed range or the predetermined speed range and the predetermined time period stored in the storage area 13. Then, the calculation unit 14 stores the calculated index value of voltage change or the calculated waveform data in the storage area 13. Next, the process proceeds to step S10, and the determination unit 15 performs the second determination operation. At that time, the determination operation terminates when any determination criterion is satisfied. On the other hand, when the determination criterion is not satisfied, the process returns to step S7. As for the second determination operation by the determination unit 15, the first determination operation (steps S4 to S6) and the second determination operation (steps S7 to S10) may be performed on the same day, or the first determination operation and the second determination operation may be performed on different days.

By performing at least two determination operations by the determination unit 15 as described above, the occurrence of an unexpected error in conclusive determination results can be reduced, and the accuracy of determining the progress of wear of the tread portion 1 can be improved.

In the embodiment of FIG. 8, an example in which the number of times of determination by the determination unit 15 is two has been described, but the number of times of determination operations is not particularly limited thereto, and may be set to any number of times equal to or greater than two times. Also, in the embodiment of FIG. 8, an example in which the process returns to step S7 when the determination criterion is not satisfied in step S10, but the process may be configured to return to step S1 when the determination criterion is not satisfied in step S10.

Figure 10:
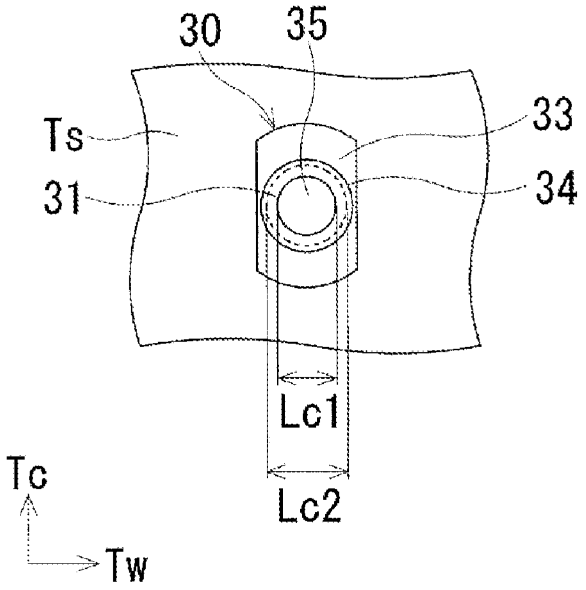
FIG. 10 is a plan view illustrating a container attached to the pneumatic tire of FIG. 9.
Figure 11:
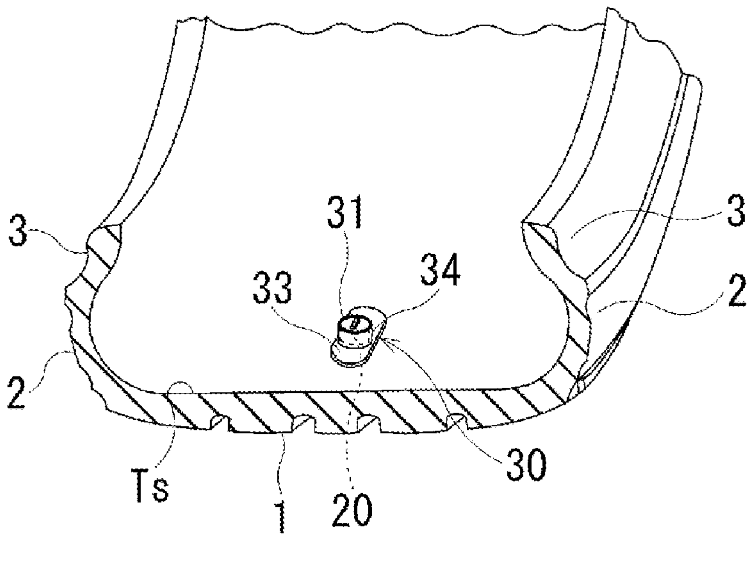
FIG. 11 is a perspective cross-sectional view illustrating a state in which a sensor module is inserted into the container of FIG. 9.
Figure 12:
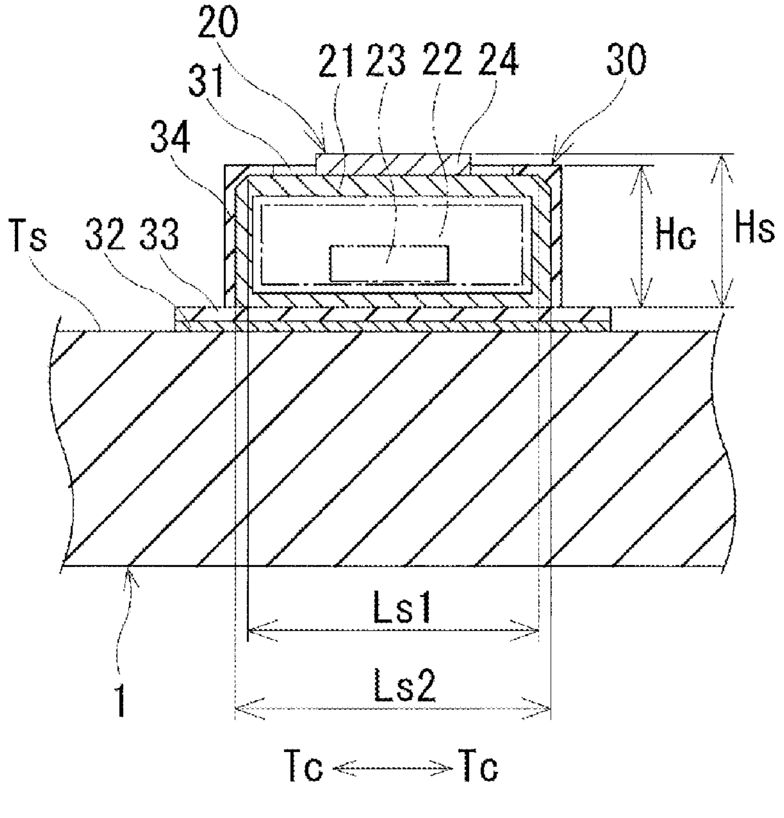
FIG. 12 is a cross-sectional view illustrating a state in which a sensor module is inserted into the container of FIG. 9.

FIG. 9 illustrates a pneumatic tire (tire T) that is a detection target of the tire information detecting device 10 according to an embodiment of the present technology. FIGS. 10 to 12 illustrate the sensor module 20 or the container 30 mounted on the tire T. In FIGS. 10 and 12, an arrow Tc represents a tire circumferential direction, and an arrow Tw represents a tire width direction.

As illustrated in FIG. 9, the tire T includes the tread portion 1 extending in the tire circumferential direction and having an annular shape, a pair of sidewall portions 2, 2 disposed on both sides of the tread portion 1, and a pair of bead portions 3, 3 disposed on inner sides of the sidewall portions 2 in a tire radial direction.

A carcass layer 4 is mounted between the pair of bead portions 3, 3. The carcass layer 4 includes a plurality of reinforcing cords extending in the tire radial direction and is folded back around a bead core 5 disposed in each of the bead portions 3 from a tire inner side to a tire outer side. A bead filler 6 having a triangular cross-sectional shape and formed of a rubber composition is disposed on the outer circumference of the bead core 5. Furthermore, an innerliner layer 9 is disposed in a region between the pair of bead portions 3, 3 on a tire inner surface Ts. The innerliner layer 9 forms the tire inner surface Ts.

On the other hand, a plurality of belt layers 7 are embedded on the outer circumferential side of the carcass layer 4 in the tread portion 1. The belt layers 7 include a plurality of reinforcing cords that are inclined with respect to the tire circumferential direction, and the reinforcing cords are disposed so as to intersect each other between the layers. In the belt layers 7, the inclination angle of the reinforcing cords with respect to the tire circumferential direction is set to fall within a range of from 10° to 40°, for example. Steel cords are preferably used as the reinforcing cords of the belt layers 7. To improve high-speed durability, at least one belt cover layer 8 formed by arranging reinforcing cords at an angle of, for example, 5° or less with respect to the tire circumferential direction is disposed on an outer circumferential side of the belt layers 7. Organic fiber cords such as nylon and aramid are preferably used as the reinforcing cords of the belt cover layer 8.

Note that the tire internal structure described above represents a typical example for a pneumatic tire, but the pneumatic tire is not limited thereto.

At least one container 30 made of rubber is fixed in a region corresponding to the tread portion 1 of the tire inner surface Ts of the tire T. The sensor module 20 is inserted into the container 30. The container 30 includes an opening portion 31 into which the sensor module 20 is inserted, and is bonded to the tire inner surface Ts via an adhesive layer 32. Since the sensor module 20 is configured to be freely housed in the container 30. the sensor module 20 can be replaced as necessary at the time of replacement, failure, or the like. In addition, since the container 30 is made of rubber, the container 30 suitably expands and contracts when the sensor module 20 is inserted into and taken out of the opening portion 31.

Examples of the material of the container 30 include chloroprene rubber (CR), butyl rubber (HR), natural rubber (NR), acrylonitrile-butadiene copolymer rubber (NBR), butadiene rubber (BR), styrene-butadiene rubber (SBR), or the like, and a single material or a blend of two or more materials can be used. Since these materials are excellent in adhesiveness to butyl rubber constituting the tire inner surface Ts, when the container 30 is formed of any of the above materials, sufficient adhesiveness between the container 30 and the tire inner surface Ts can be secured.

As illustrated in FIG. 12, the sensor module 20 includes a housing 21 and an electronic component 22. The housing 21 has a hollow structure and accommodates the electronic component 22 inside. The electronic component 22 may be configured to include a transmitter, a receiver, a control circuit, a battery as appropriate, together with a sensor 23 that acquires the above-described tire information such as voltage, speed, air pressure, and temperature of the tire T. As the sensor 23, for example, a speed sensor (the speed detection unit 16), a pressure sensor (the air pressure detection unit 17), or a temperature sensor (the temperature detection unit 18) can be used together with a piezoelectric sensor (the element 11 and the voltage detection unit 12). In particular, the piezoelectric sensor includes the element 11 that generates voltage based on deformation of the tread portion 1 during tire rotation. The piezoelectric sensor is different from a piezoelectric-type acceleration sensor. An acceleration sensor or a magnetic sensor other than the sensors described above can also be used. In addition, the sensor module 20 is configured to be capable of transmitting the tire information acquired by the sensor 23 to the storage area 13. Further, in order to make it easy to hold the sensor module 20, a knob portion 24 protruding from the housing 21 may be provided, and the knob portion 24 can have a function of an antenna. Note that the internal structure of the sensor module 20 illustrated in FIG. 12 is an example of the sensor module, and the internal structure is not limited to thereto.

The container 30 is bonded to the tire inner surface Ts via the adhesive layer 32. The container 30 includes a base portion 33 having a plate shape and joined to the tire inner surface Ts, a tube portion 34 having a cylindrical shape and protruding from the base portion 33, and a housing portion 35 formed in the tube portion 34. The housing portion 35 communicates with the opening portion 31 having a circular shape. Thus, the housing portion 35 has a substantially quadrangle cross-sectional shape with the base portion 33 as a bottom surface and the opening portion 31 as an upper surface. The sensor module 20 having a cylindrical shape with a tapered upper surface is housed in the housing portion 35. Note that the shapes of the base portion 33, the tube portion 34, and the housing portion 35 are not limited to a particular shape and can be appropriately changed according to the shape of the sensor module 20 to be inserted into the container 30.

The adhesive layer 32 is not limited and only needs to bond the rubber composition. For example, a cyanoacrylate-based adhesive (instantaneous adhesive) or a polyurethane-based adhesive is preferably used as the adhesive layer 32. A cyanoacrylate-based adhesive is suitable because the working time for installing the container 30 on the tire inner surface Ts can be reduced, and a polyurethane-based adhesive is suitable because the adhesiveness with the vulcanized rubber is excellent. As the adhesive layer 32, an adhesive tape, a vulcanized adhesive that is naturally vulcanized (vulcanizable at normal temperature), or a puncture repair agent used as an emergency treatment when a pneumatic tire is punctured may be used. When a vulcanized adhesive is used as the adhesive layer 32, it is unnecessary to perform a primer treatment needed for fixing the container using an adhesive tape and thus can improve productivity. Note that the primer treatment (base coat treatment) is preliminarily applied to the tire inner surface to improve adhesiveness.

The above-described pneumatic tire includes, on the tire inner surface Ts, at least one container 30 made of rubber and configured to be used for insertion of the sensor module 20. The container 30 includes the base portion 33 having a plate shape and joined to the tire inner surface Ts via the adhesive layer 32, the tube portion 34 protruding from the base portion 33, the housing portion 35 formed in the tube portion 34, and the opening portion 31 communicating with the housing portion 35. Accordingly, it is possible to easily perform an operation of inserting the sensor module 20 into the container 30, and securely hold the sensor module 20 by tightening of the container 30 so as to prevent the sensor module 20 from falling off.

Preferably, in the above-described pneumatic tire, the container 30 is bonded to the tire inner surface Ts via the adhesive layer 32, and as roughness of the tire inner surface Ts, an arithmetic mean height Sa ranges from 0.3 μm to 15.0 μm, and a maximum height Sz ranges from 2.5 μm to 60.0 μm. By appropriately setting the arithmetic mean height Sa and the maximum height Sz as the roughness of the tire inner surface Ts in this manner, the adhesion area between the tire inner surface Ts and the adhesive layer 32 can be increased, and the adhesiveness between the tire inner surface Ts and the container 30 can be improved effectively. When the arithmetic mean height Sa exceeds 15.0 μm and the maximum height Sz exceeds 60.0 μm, the adhesive layer 32 cannot follow the unevenness of the tire inner surface Ts, and the adhesiveness tends to decrease. Note that the arithmetic mean height Sa and the maximum height Sz are values measured in accordance with ISO25178 and can be measured using a commercially available surface properties measuring machine (e.g., a shape analysis laser microscope or a 3D shape measuring machine). The measurement method may be any of a contact type or a non-contact type.

In FIGS. 9 and 11, the container 30 is disposed on an inner side of the ground contact edge in the tire width direction. Additionally, the container 30 may be biased on one side in the tire width direction with respect to the tire center line CL. The sensor 23 in the sensor module 20 inserted into the container 30 can accurately acquire tire information.

In the above-described pneumatic tire, the container 30 is preferably set to have the following dimensions. A width Lc1 of the opening portion 31 of the container 30 and an inner width Lc2 of the bottom surface of the container 30 preferably satisfy a relationship $Lc1<Lc2$. By making the width Lc1 of the opening portion 31 narrower than the inner width Lc2 of the bottom surface of the container 30 in this manner, a restricting force on the upper surface side of the container 30 is increased, and the sensor module 20 inserted into the container 30 can be effectively prevented from falling off. Accordingly, both workability for inserting the sensor module 20 and holding property of the container 30 can be provided in a compatible manner. Both the width Lc1 of the opening portion 31 and the inner width Lc2 of the bottom surface of the container 30 are measured in a state where the sensor module 20 is not inserted into the container 30.

Additionally, an average thickness of the container 30 preferably ranges from 0.5 mm to 5.0 mm. By appropriately setting the average thickness of the container 30 in this manner, it is possible to improve the workability for inserting the sensor module 20, the holding property of the container 30, and the breaking resistance of the container 30 in a well-balanced manner. Here, when the average thickness of the container 30 is thinner than 0.5 mm, the container 30 is easily broken when the sensor module 20 is inserted. When the average thickness of the container 30 is thicker than 5.0 mm, the rigidity of the container 30 becomes excessively large, and the sensor module 20 cannot be easily inserted. The average thickness of the container 30 is obtained by measuring the thickness of the rubber constituting the container 30.

In particular, the container 30 and the sensor module 20 preferably satisfy the following dimensional relationship. The width Lc1 of the opening portion 31 of the container 30 and a maximum width Lsm of the sensor module 20 to be inserted into the container 30 preferably satisfy a relationship $0.10 \leq Lc1/Lsm \leq 0.95$, more preferably satisfy a relationship $0.15 \leq Lc1/Lsm \leq 0.80$, and most preferably satisfy a relationship $0.15 \leq Lc1/Lsm \leq 0.65$. By appropriately setting the ratio of the width Lc1 of the opening portion 31 of the container 30 to the maximum width Lsm of the sensor module 20 in this manner, it is possible to effectively prevent the sensor module 20 from falling off, and it is possible to improve the workability for inserting the sensor module 20 and the holding property of the container 30. In the sensor module 20 illustrated in FIG. 12, the maximum width Lsm corresponds to a width Ls2 of the lower surface.

Further, the width Lc1 of the opening portion 31 of the container 30, the inner width Lc2 of the bottom surface of the container 30, a width Ls1 of the upper surface of the sensor module 20, and a width Ls2 of the lower surface of the sensor module 20 preferably satisfy a relationship $Lc1<Ls1 \leq Ls2 \leq Lc2$. Furthermore, the upper surface of the sensor module 20 is preferably formed in a tapered shape so as to satisfy a relationship $Ls1<Ls2$. By appropriately setting the widths of the container 30 and the sensor module 20 in this manner, it is possible to effectively prevent the sensor module 20 from falling off. Alternatively, in the sensor module 20, it is also possible to employ a form in which the diameter is gradually decreased from the upper surface thereof toward the lower surface. In that case, it is preferable to satisfy relationships $Ls2<Ls1$, $Ls2\leq Lc2$, and $Lc1<Ls1$.

Furthermore, the ratio of a height Hc of the container 30 with the sensor module 20 inserted to a height (maximum height) Hs of the sensor module 20 preferably ranges from 0.5 to 1.5, more preferably ranges from 0.6 to 1.3, and most preferably ranges from 0.7 to 1.0. By appropriately setting the ratio of the height Hc of the container 30 to the height Hs of the sensor module 20 in this manner, it is possible to effectively prevent the sensor module 20 from falling off. When the knob portion 24 is provided in the sensor module 20, the height Hs of the sensor module 20 is a height including the knob portion 24 (see FIG. 12). Also, the height Hc of the container 30 does not include the height of the base portion 33 and is a height of the cylindrical portion 34 (see FIG. 12).

In the above-described pneumatic tire, the rubber constituting the container 30 preferably has the following physical properties. The elongation at break EB preferably ranges from 50% to 900%, and the modulus at 300% elongation (M300) preferably ranges from 2 MPa to 15 MPa. By appropriately setting the elongation at break EB and the modulus (M300) in this manner, it is possible to improve the workability for inserting the sensor module 20, the holding property of the container 30, and the breaking resistance of the container 30 in a well-balanced manner.

EXAMPLES

Tires of Examples 1 to 6 having a tire size of 275/40R21 were manufactured. The tires include at least one sensor module disposed on the tire inner surface, an element that is mounted on the sensor module and configured to generate a voltage based on deformation of a tread portion during tire rotation, a voltage detection unit configured to detect the voltage generated by the element, a storage area configured to store waveform data of the voltage detected by the voltage detection unit over time, a calculation unit configured to calculate, from the waveform data stored in the storage area, a symmetry of the waveform data that is an index value of the attachment state of the sensor module and calculates the index value of the voltage change from the waveform data stored in the storage area, and a determination unit configured to determine the attachment state of the sensor module based on the symmetry of the waveform data calculated by the calculation unit and determines a progress of wear of the tread portion by comparing the index value of the voltage change calculated by the calculation unit with reference information. The sensor module is fixed to the tire inner surface via a container in which the sensor module is housed. The container has an opening portion into which the sensor module is inserted. The ratio of a width Lc1 of the opening portion to a maximum width Lsm of the sensor module (Lc1/Lsm) is set according to Table 1.

The test tires were evaluated for attachment state detecting performance, wear detecting performance, workability for inserting the sensor module, and durability by test methods described below, and the results are collectively indicated in Table 1.

Attachment State Detecting Performance:

For each test tire. the attachment state of the sensor module was determined by the tire information detecting device. For example, in the tire of Example 1, the waveform data as illustrated in FIG. 2 was obtained. As shown in the drawing, it was confirmed that the waveform data had symmetry when the attachment state of the sensor module was good. That is, the waveform data is useful as an index value of the attachment state of the sensor module, and a correlation between the voltage and the attachment state of the sensor module was confirmed. Examples 2 to 6 also indicated "Good" in Table 1 when there was a correlation between the voltage and the attachment state of the sensor module.

Figure 13:
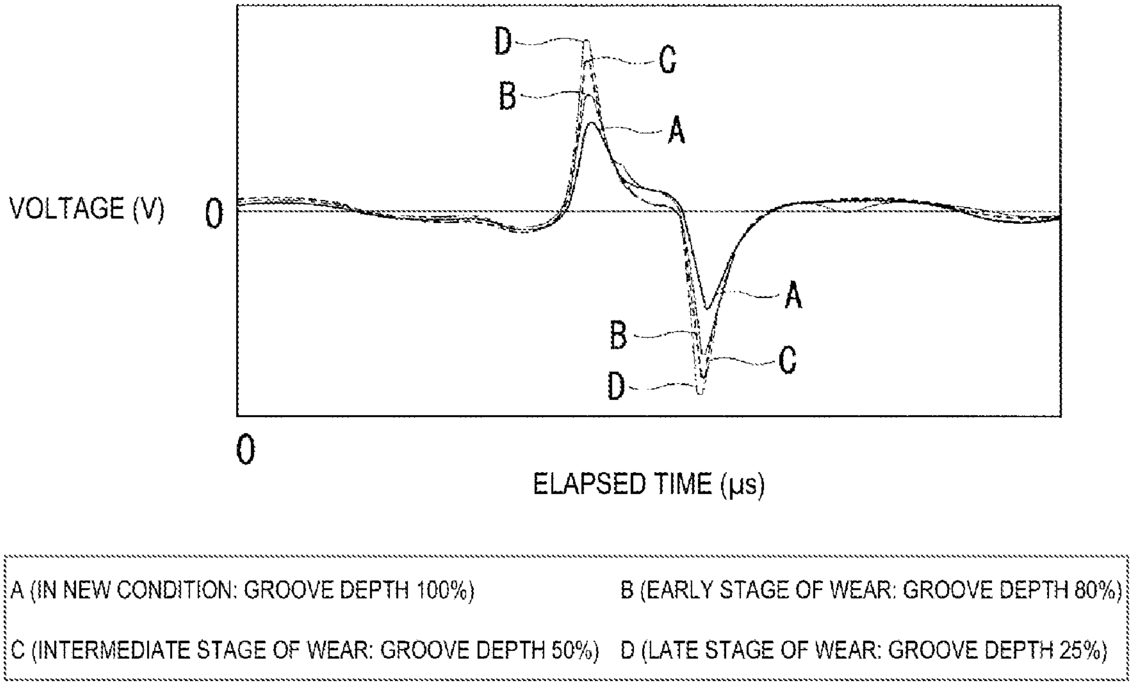
FIG. 13 is a graph showing waveform data at a plurality of points in time in a pneumatic tire according to Example 1.

Wear Detecting Performance:

For each test tire, the progress of wear of the tread portion was determined by the tire information detecting device. In the tire of Example 1, for example, the waveform data as illustrated in FIG. 13 was obtained. As illustrated, the peak amplitude value of the waveform data at each point in time gradually increased as wear of the tread portion progressed from a new condition A to a late stage of wear D (as a ratio of a groove depth at each point in time to a groove depth when in new condition decreased). That is, the peak amplitude value of the waveform data is useful as an index value of voltage change, and a correlation between the voltage and the groove depth was confirmed. Examples 2 to 6 also indicated "Good" in Table 1 when there was a correlation between the voltage and the groove depth.

Workability for Inserting Sensor Module:

For each test tire, the time required for inserting the sensor module into the container provided on the tire inner surface was measured. The evaluation results are expressed as index values using the reciprocal of the measurement values, with Example 1 being assigned an index value of 100. The larger the index value is, the easier the insertion of the sensor module is.

Durability:

Each test tire was mounted on a wheel having a rim size of 21×9.5 J, and a running test was performed by using a drum testing machine under the conditions of an air pressure of 120 kPa, a load at 102% with respect to the maximum load, a running speed of 81 km/h, and a running distance of 10000 km. After the test was performed, presence of breakage of the container or falling off of the sensor module was visually confirmed. The evaluation results are expressed as the presence of breakage of the container and the presence of falling off of the sensor module.

TABLE 1

| | Example 1 | Example 2 | Example 3 | Example 4 | Example 5 | Example 6 |
|---|---|---|---|---|---|---|
| Ratio of width Lc1 of opening portion to maximum width Lsm of sensor module (Lc1/Lsm) | 0.09 | 0.10 | 0.50 | 0.90 | 0.90 | 0.95 |

TABLE 1-continued

| | Example 1 | Example 2 | Example 3 | Example 4 | Example 5 | Example 6 |
|---|---|---|---|---|---|---|
| Attachment state detecting performance | Good | Good | Good | Good | Good | Good |
| Wear detecting performance | Good | Good | Good | Good | Good | Good |
| Workability for inserting sensor module | 100 | 101 | 103 | 105 | 105 | 106 |
| Durability (presence of breakage of container) | Yes | No | No | No | No | No |
| Durability (presence of falling off of sensor module) | No | No | No | No | No | Yes |

As can be seen from Table 1, the tire information detecting devices of Examples 1 to 6 had good attachment state detecting performance and good wear detecting performance. The pneumatic tires of Examples 2 to 6 had improved workability for inserting the sensor module as compared with Example 1. The pneumatic tires of Examples 3 to 5 had no breakage of the container and no falling off of the sensor module.

The invention claimed is:

1. A tire information detecting device configured to detect tire information including at least one of wear of a tire, deformation of the tire, a road surface state, a ground contact state of the tire, presence of failure of the tire, a travel history of the tire, or a load state of the tire, the tire information detecting device comprising:

at least one sensor module disposed on a tire inner surface;

a determination unit configured to determine an attachment state of the sensor module based on a measurement value supplied from the sensor module;

an element that is mounted on the sensor module and configured to generate a voltage based on deformation of a tread portion during tire rotation;

a voltage detection unit configured to detect the voltage generated by the element;

a storage area configured to store waveform data of the voltage detected by the voltage detection unit over time; and a calculation unit configured to calculate, from the waveform data stored in the storage area, a symmetry of the waveform data that is an index value of the attachment state of the sensor module, wherein the determination unit determines the attachment state of the sensor module based on the symmetry of the waveform data calculated by the calculation unit;

a container is disposed on an inner side of a ground contact edge in a tire width direction; and the sensor module is fixed to the tire inner surface via the container into which the sensor module is inserted.

2. The tire information detecting device according to claim 1, wherein the calculation unit extracts a waveform including a first peak point and a second peak point respectively formed on one side and another side from a baseline of the waveform data and calculates a line segment SO and a line segment OF from an intersection O where a line connecting the first peak point and the second peak point intersects the baseline of the waveform data, a starting point S of the waveform, and an end point F of the waveform data, and the determination unit determines that the attachment state of the sensor module is good when a ratio of a short line segment to a long line segment of the line segment SO and the line segment OF ranges from 0.4 to 1.0.

3. The tire information detecting device according to claim 1, wherein the calculation unit extracts a waveform including a first peak point and a second peak point respectively formed on one side and another side from a baseline of the waveform data and calculates an absolute difference $|P1-B|$ between a value P1 of the first peak point and a value B of the baseline of the waveform data and an absolute difference $|B-P2|$ between the value B of the baseline of the waveform data and a value P2 of the second peak point, and the determination unit determines that the attachment state of the sensor module is good when a ratio $|P1-B|/|B-P2|$ of the absolute difference $|P1-B|$ to the absolute difference $|B-P2|$ ranges from 0.2 to 5.0.

4. The tire information detecting device according to claim 1, wherein the calculation unit extracts a waveform including a first peak point and a second peak point respectively formed on one side and another side from a baseline of the waveform data and calculates an intersection O where a line connecting the first peak point and the second peak point intersects the baseline of the waveform data and areas A1 and A2 of the waveform on both sides of a waveform center axis that passes through the intersection O and is orthogonal to the baseline of the waveform data, and the determination unit determines that the attachment state of the sensor module is good when a ratio of a small area to a large area of the area A1 and the area A2 ranges from 0.4 to 1.0.

5. The tire information detecting device according to claim 1, wherein the calculation unit calculates an index value of voltage change from the waveform data stored in the storage area, and the determination unit determines a progress of wear of the tread portion by comparing the index value of the voltage change calculated by the calculation unit with reference information.

6. The tire information detecting device according to claim 5, wherein the calculation unit calculates, as the index value of voltage change, a peak amplitude value between a maximum value P1 and a minimum value P2 in the waveform data.

7. The tire information detecting device according to claim 5, comprising an air pressure detection unit configured to detect air pressure inside a tire, wherein the calculation unit corrects the waveform data or a predetermined threshold value based on the air pressure detected by the air pressure detection unit.

8. The tire information detecting device according to claim 5, wherein the determination unit performs at least two determination operations and conclusively determines the progress of wear of the tread portion based on results of the determination operations.

9. The tire information detecting device according to claim 5, wherein the sensor module includes at least the element and the voltage detection unit.

10. The tire information detecting device according to claim 1, comprising a speed detection unit configured to detect vehicle speed or tire rotation speed, wherein the storage area stores the waveform data of the voltage detected by the voltage detection unit over time together with the vehicle speed or the tire rotation speed detected by the speed detection unit, the calculation unit calculates an index value of voltage change from waveform data in a predetermined speed range stored in the storage area, and the determination unit determines a progress of wear of the tread portion by comparing the index value of the voltage change calculated by the calculation unit with reference information corresponding to the predetermined speed range.

11. The tire information detecting device according to claim 1, comprising a speed detection unit configured to detect vehicle speed or tire rotation speed, wherein the storage area stores the waveform data of the voltage detected by the voltage detection unit over time together with the vehicle speed or the tire rotation speed detected by the speed detection unit, the calculation unit calculates frequency of exceedance of a predetermined threshold value from the waveform data in a predetermined speed range and a predetermined time period stored in the storage area, and the determination unit determines a progress of wear of the tread portion based on the frequency of exceedance of the predetermined threshold value calculated by the calculation unit.

12. The tire information detecting device according to claim 1, wherein the container is bonded to the tire inner surface via an adhesive layer, and as roughness of the tire inner surface, an arithmetic mean height Sa ranges from 0.3 um to 15.0 μm, and a maximum height Sz ranges from 2.5 μm to 60.0 μm.

13. The tire information detecting device according to claim 1, wherein a width Lc1 of an opening portion of the container and an inner width Lc2 of a bottom surface of the container satisfy a relationship $Lc1<Lc2$.

14. The tire information detecting device according to claim 1, wherein a width Lc1 of an opening portion of the container and a maximum width Lsm of the sensor module satisfy a relationship $0.10 \leq Lc1/Lsm \leq 0.95$.

15. The tire information detecting device according to claim 1, wherein a width Lc1 of an opening portion of the container, an inner width Lc2 of a bottom surface of the container, a width Ls1 of an upper surface of the sensor module, and a width Ls2 of a lower surface of the sensor module satisfy a relationship $Lc1<Ls1 \leq Ls2 \leq Lc2$.

16. The tire information detecting device according to claim 1, wherein an average thickness of the container ranges from 0.5 mm to 5.0 mm.

17. The tire information detecting device according to claim 1, wherein a ratio of a height Hc of the container with the sensor module inserted to a height Hs of the sensor module ranges from 0.5 to 1.5.

18. The tire information detecting device according to claim 1, wherein an elongation at break EB of rubber constituting the container ranges from 50% to 900%, and a modulus at 300% elongation of the rubber constituting the container ranges from 2 MPa to 15 MPa.

19. A tire information detecting device configured to detect tire information including at least one of wear of a tire, deformation of the tire, a road surface state, a ground contact state of the tire, presence of failure of the tire, a travel history of the tire, or a load state of the tire, the tire information detecting device comprising:

at least one sensor module disposed on a tire inner surface; and a determination unit configured to determine an attachment state of the sensor module based on a measurement value supplied from the sensor module; wherein a container is disposed on an inner side of a ground contact edge in a tire width direction, and a width Lc1 of an opening portion of the container and an inner width Lc2 of a bottom surface of the container satisfy a relationship $Lc1<Lc2$.

20. A tire information detecting device configured to detect tire information including at least one of wear of a tire, deformation of the tire, a road surface state, a ground contact state of the tire, presence of failure of the tire, a travel history of the tire, or a load state of the tire, the tire information detecting device comprising:

at least one sensor module disposed on a tire inner surface;

a determination unit configured to determine an attachment state of the sensor module based on a measurement value supplied from the sensor module;

an element that is mounted on the sensor module and configured to generate a voltage based on deformation of a tread portion during tire rotation;

a voltage detection unit configured to detect the voltage generated by the element;

a storage area configured to store waveform data of the voltage detected by the voltage detection unit over time; and a calculation unit configured to calculate, from the waveform data stored in the storage area, a symmetry of the waveform data that is an index value of the attachment state of the sensor module, wherein the determination unit determines the attachment state of the sensor module based on the symmetry of the waveform data calculated by the calculation unit;

a container is disposed on an inner side of a ground contact edge in a tire width direction; and the element is a piezoelectric element.

* * * * *